United States Patent [19]

Turner et al.

[11] Patent Number: 4,914,539
[45] Date of Patent: Apr. 3, 1990

[54] REGULATOR FOR INDUCTIVELY COUPLED POWER DISTRIBUTION SYSTEM

[75] Inventors: James B. Turner, Mountlake Terrace; Gary W. Roth, Lynnwood, both of Wash.

[73] Assignee: The Boeing Company, Seattle, Wash.

[21] Appl. No.: 324,205

[22] Filed: Mar. 15, 1989

[51] Int. Cl.4 ............................................. H02H 7/10
[52] U.S. Cl. ........................................ 361/18; 361/56; 323/223; 323/280; 323/281
[58] Field of Search ...................... 361/18, 54, 56, 57; 323/223, 234, 265, 280, 281, 222, 290

[56] References Cited

U.S. PATENT DOCUMENTS

| | | | |
|---|---|---|---|
| 3,037,160 | 5/1962 | Manteuffel | 323/56 |
| 3,129,381 | 4/1964 | Manteuffel | 323/89 |
| 3,544,885 | 12/1970 | Friedlander et al. | 323/61 |
| 3,569,833 | 3/1971 | Milton | 325/26 |
| 3,818,314 | 6/1974 | Bishop et al. | 321/45 R |
| 3,955,134 | 5/1976 | Woodford | 323/61 |
| 4,017,790 | 4/1977 | Friedlander | 323/110 |
| 4,254,372 | 3/1981 | Moore, Jr. | 323/280 X |
| 4,428,078 | 1/1984 | Kuo | 455/3 |
| 4,439,722 | 3/1984 | Budnik | 323/248 |
| 4,558,229 | 12/1985 | Massey et al. | 307/17 |
| 4,719,552 | 1/1988 | Albach et al. | 323/282 X |

OTHER PUBLICATIONS

Friedlander, "Static Network Stabilization, Recent Progress in Reactive Power Control," 1966.

*Primary Examiner*—Derek S. Jennings
*Attorney, Agent, or Firm*—Christensen, O'Connor, Johnson & Kindness

[57] ABSTRACT

A regulator circuit for use with a connectorless power supply system in which power is inductively supplied to a plurality of remote loads. A sinusoidal current, at a frequency of 38 kHz, is provided by a power distribution system (10), and circulates through a supply loop (68), which is disposed under the floor of an aircraft cabin. Three parallel connected capacitors (78, 80, and 82) and a multi-turn coil (70) that is inductively coupled to the supply loop comprise a resonant tank circuit in which current circulates. The voltage developed across the tank circuit is half wave rectified, filtered, and supplied to a load connected circuit. An op-amp (134) compares the potential across the load to a regulated voltage. The output of the op-amp is used to control the period of time during which an N channel FET (96) shunts current to regulate the output voltage. Because the N channel FET is only permitted to shunt current to control the output voltage when the potential of the AC current flowing in the tank circuit passes through zero with a negative slope, the regulator circuit produces minimal EMI. The regulator circuit controls the output voltage with respect to variations in the inductive coupling between the supply loop and the pickup coil, and with respect to variations in the connected load.

18 Claims, 2 Drawing Sheets

REGULATOR FOR INDUCTIVELY COUPLED POWER DISTRIBUTION SYSTEM

TECHNICAL FIELD

This invention generally pertains to a system for distributing power to a plurality of loads inductively coupled to a supply loop, and more specifically, to a regulator for the distributed loads.

BACKGROUND OF THE INVENTION

Airline companies ordering aircraft often specify a number of design options to the manufacturer, including passenger seating layout. The manufacturing and inventory costs incurred in providing different seating arrangements and spacing between seats can be significant, and will be particularly important in the next generation of aircraft that will offer new personal entertainment and service facilities to each passenger. Designers are planning to install an entertainment system and passenger service system in the back of each seat on such aircraft. Consequently, each seating arrangement that an airline company might specify would typically require different length power lead harnesses to supply power to the seats. The cost and weight penalty associated with providing power for each seat using conventional techniques would likely be unacceptable to most passenger carriers.

An alternative to wiring each seat to a power source is disclosed in commonly assigned U.S. Pat. No. 4,428,078 (C. Kuo). This patent discloses what is referred to therein as a "wireless system" for supplying power to a plurality of multiple-turn pickup coils disposed in the base of seats throughout an aircraft cabin. Perhaps this technology would more accurately be described as a "connectorless" power supply system, because power is inductively coupled from a power supply loop that is disposed in the base of seats throughout an aircraft cabin to the pickup coils without the use of a direct electrical connection. The power is used to operate the passenger entertainment and service systems installed in the seats. This wireless system permits seats to be moved about in different arrangements as required by individual airline carriers, without concern for providing different length interconnecting wiring harnesses. Not disclosed in the patent are details concerning the regulation of voltage at each of the distributed loads that are inductively coupled to the supply loop.

The wireless power distribution system described in the above patent has been further developed, and now includes a precisely controlled constant current source driving a series resonant supply loop. Since the mutual inductance of the pickup coils appears in series in the supply loop, the constant current source can only maintain a constant voltage at the output of the pickup coil so long as the mutual inductance and load remain constant. However, the mutual inductance is inversely proportional to the distance between the supply loop and the pickup coils, and that distance may vary significantly. In addition, the electrical load imposed on each pickup coil by the entertainment and passenger service systems is likely to vary over a relatively wide range. Due to the existence of these variable parameters, a regulator must be provided for each pickup coil to maintain a constant voltage across its load.

Conventional regulators such as series pass and shunt regulators may produce unacceptable electromagnetic interference (EMI) and possible disruption of the constant current source. In addition, conventional regulators tend to be inefficient, because they dissipate excessive amounts of power, and they typically involve a high part count and an unacceptable cost factor.

In consideration of the above-described problems, it is an object of the present invention to provide a low cost regulator for each load of a connectorless power distribution system. Other objects and advantages of the present invention will be apparent from the attached drawings and the Description of the Preferred Embodiment that follows.

SUMMARY OF THE INVENTION

In a power supply system having a power source for producing an AC signal that is resonantly and inductively coupled to a pickup circuit, apparatus is provided for regulating a DC voltage on an output of the pickup circuit to a predetermined level. The apparatus includes means connected to the output of the pickup circuit for producing a regulated reference voltage having a magnitude substantially less than the predetermined level. Divider means, connected to the output of the pickup circuit, are operative to provide a comparison voltage that varies as a function of the DC voltage and has a magnitude less than the DC voltage. Comparator means produce a signal that varies as a function of the difference between the regulated reference voltage and the comparison voltage. The shunt means, which are connected to receive the signal from the comparator means, shunt a current flowing through the pickup circuit so that it circulates within the pickup circuit and does not reach the output for an interval of time that varies as a function of the signal.

The divider means comprise a variable voltage divider network and include means for adjusting the magnitude of the comparison voltage to determine the level of the DC voltage on the output of the pickup circuit. Further, the pickup circuit includes means for rectifying the AC signal coupled to the pickup circuit to produce a rectified current, and means for filtering the rectified current to produce the DC voltage.

The shunt means preferably comprise a solid-state switch connected to short the rectified current for the time interval determined by the signal from the comparator means. The AC signal periodically changes between peak positive and negative voltage levels, passing through a zero voltage level, and the time interval during which the solid-state switch shorts the rectified signal generally starts when the AC signal is at the zero voltage level. Since the solid-state switch changes state at a substantially zero voltage level, almost no electromagnetic interference is produced with it switches. The means for producing a regulated reference voltage comprises a solid-state voltage regulator.

A method for regulating a DC voltage on an output of the pickup circuit comprises a further aspect of the present invention. This method includes steps implemented generally in accordance with the functions of the above-described apparatus.

BRIEF DESCRIPTION OF THE DRAWINGS

FIG. 3 graphically illustrates a waveform within the regulator circuit as the output voltage is regulated.

DESCRIPTION OF THE PREFERRED EMBODIMENT

As noted above, a system for distributing power and communication signals to a load installed within the seats of an aircraft is disclosed in detail in commonly assigned U.S. Pat. No. 4,428,078. The disclosure of that patent is specifically incorporated herein by reference, in its entirety. The present invention represents a further development of the above-referenced power distribution system, and in a preferred embodiment, is directed to providing regulation of the voltage applied to each of a plurality of remotely located loads, specifically passenger entertainment and service systems that are installed in passenger seat groups within the cabin of an aircraft. DC power required by the passenger entertainment and service systems is provided through a multi-turn pickup coil disposed at the base of each group of seats, proximate a supply loop, as disclosed in the above-referenced patent.

Figure 1:
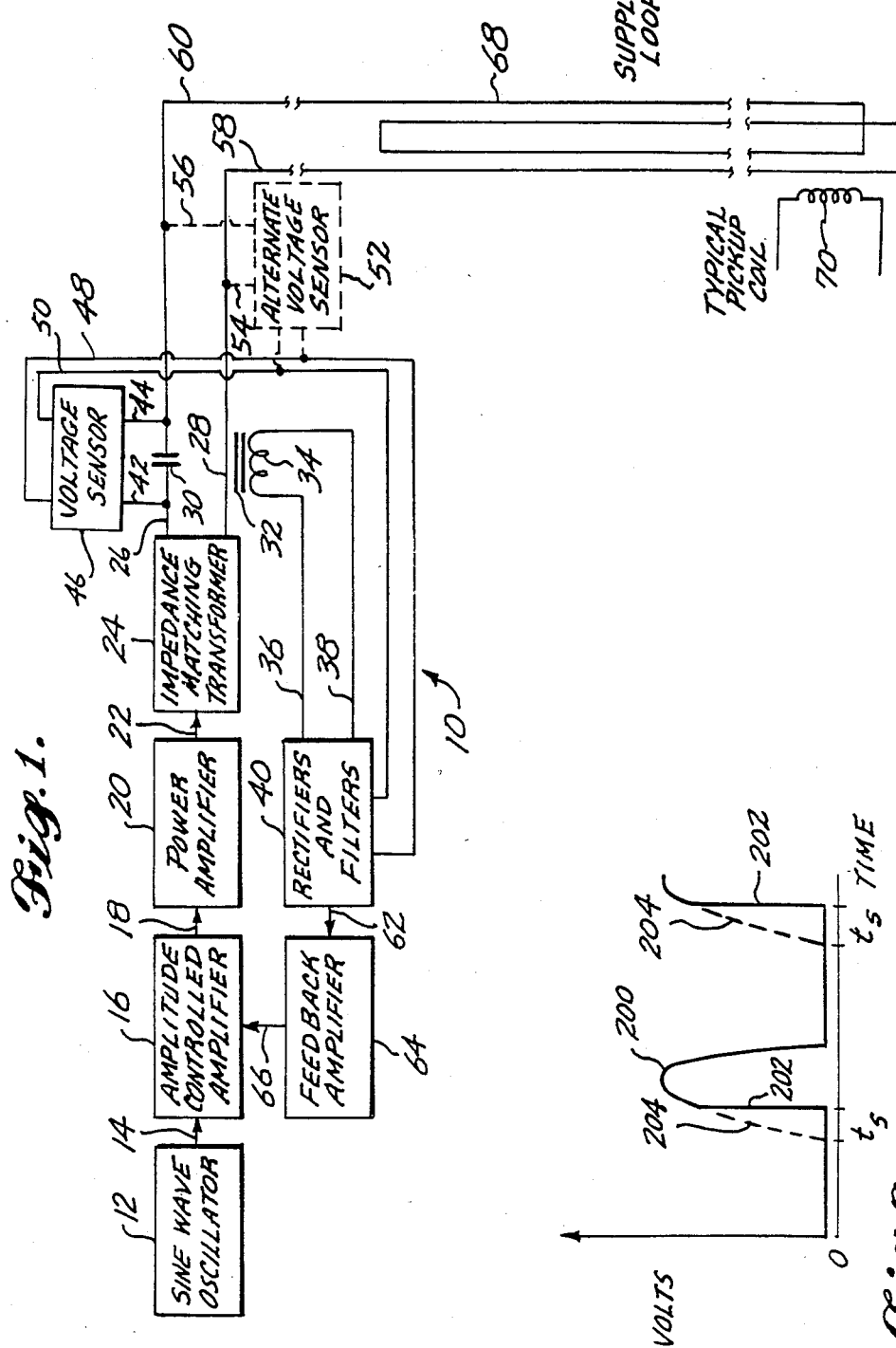
FIG. 1 is a schematic block diagram illustrating the power distribution system which drives a series resonant supply loop, and a typical pickup coil, which is inductively coupled to the supply loop.

With reference now to FIG. 1, an inductively coupled power distribution system incorporating the present invention is generally shown at 10. The first component of the power distribution system is a sine wave oscillator 12, which produces a sine wave signal having a frequeny of 38 kHz in the preferred embodiment. Sine wave oscillator 12 has a relatively low distortion rating to avoid creating high order harmonics on its output that might cause electromagnetic interference (EMI) with respect to the operation of the communication systems and other electronic avionics gear on the aircraft. Although a square wave generator or other periodic signal source could be used in the power distribution system, the harmonic content of nonsinusoidal waveforms and the resulting EMI would typically be unacceptable for the proposed application.

The 38 kHz signal produced by sine wave oscillator 12 is conveyed through a lead 14 to the input of an amplitude controlled amplifier 16. The voltage gain of amplitude controlled amplifier 16 is controlled by a feedback signal, as described in further detail below. A signal output from the amplitude controlled amplifier is conveyed through a lead 18 to the input of a power amplifier 20, which has a rated output capacity sufficient to supply the total maximum power requirement of the load inductively coupled to power distribution system 10. Power amplifier 20 introduces minimal harmonic distortion in its 38 kHz constant current sinusoidal output signal, thereby avoiding potential EMI problems. Since power amplifier 20 operates at a single frequency, its design may be optimized for that frequency.

The output impedance of power amplifier 20 is relatively low; to ensure efficient power transfer, the output of the power amplifier is connected through a lead 22 to an impedance matching transformer 24 having an input impedance that matches the output impedance of the power amplifier. Similarly, the output impedance of the transformer matches the impedance of a supply loop 68 through which output current from the impedance matching transformer circulates. The output current from the impedance matching transformer flows through a lead 26, which is connected to one side of a series resonant capacitor 30. The other side of series resonant capacitor 30 is connected to supply loop 68 through a lead 60. Current flows through a lead 58 from supply loop 68, and through a current sensing transformer 32, returning to impedance matching transformer 24 through a lead 28. The capacitance of series resonant capacitor 30 is selected so that supply loop 68 resonates at 38 kHz. The inductive reactance of supply loop 68 primarily comprises a leakage inductance. The leakage inductance is nullified or compensated by series resonant capacitor 30, so that the remaining impedance of supply loop 68 comprises its resistance and the total mutual inductance of the supply loop and plurality of pickup coils to which power is supplied.

The electrical load represented by the passenger entertainment and service systems is variable. Proper operation of power distribution system 10 requires a constant current flow through supply loop 68. Constant current is achieved by providing a feedback signal to control the voltage gain of amplitude controlled amplifier 16. Current flowing through supply loop 68 is monitored by current sensing transformer 32. A secondary winding 34 of this transformer is connected through leads 36 and 38 to a Rectifier and Filter Circuit 40. The current flowing in secondary winding 34 and through leads 36 and 38 is thus proportional to the current flowing through supply loop 68. Rectifier and Filter Circuit 40 includes a shunt resistor (not shown) across which a voltage drop is developed corresponding to the magnitude of the supply loop current. The voltage developed across the shunt resistor due to the secondary current of current sensing transformer 32 is full wave rectified and filtered within Circuit 40, producing a DC feedback signal indicative of the magnitude of the current in supply loop 68.

A voltage sensor 46 is connected across series resonant capacitor 30 by leads 42 and 44 and is operative to monitor the voltage across the device, producing another input signal for Rectifier and Filter Circuit 40, which is carried over leads 48 and 50. This input signal from voltage sensor 46 is also full wave rectified and filtered within Rectifier and Filter Circuit 40, producing a DC feedback signal indicative of the supply loop voltage. The filtered and rectified current and voltage feedback signals are summed, producing a combined feedback signal that is output from Rectifier and Filter Circuit 40 through a lead 62 to a feedback amplifier 64. An amplified feedback signal output from the feedback amplifier is input to amplitude controlled amplifier 16 over a lead 66 to control its gain.

Current sensing transformer 32 ensures that a constant current is maintained within supply loop 68, while voltage sensor 46 monitors the voltage drop across series resonant capacitor 30 to ensure that excessive power is not drawn by the supply loop in response to the load. Leads 42 and 44 and voltage sensor 46 may be replaced by an alternate voltage sensor 52, having an input connected across the supply loop by leads 54 and 56. The output of the alternate voltage sensor is connected to leads 48 and 50 in place of the output of voltage sensor 46. Alternate voltage sensor 52 serves the same function as voltage sensor 46, i.e., protection against overload of power amplifier 20, by monitoring the voltage developed across supply loop 68.

Supply loop 68 is installed within the floor of the aircraft cabin, in a configuration similar to that described in the referenced U.S. Pat. No. 4,428,078, with respect to a supply loop 26, which is shown in FIGS. 1 through 4 of that reference. In the preferred embodiment of the present invention, supply loop 68 comprises four turns of copper wire formed into a loop approximately thirty feet in length. The number of turns and size of the conductor used for the supply loop are in part determined by the maximum rated power demand of the load and the magnitude of the constant current flowing within supply loop 68. The conductor comprising supply loop 68 is covered with a nonferrous flooring material that protects it from damage, yet avoids magnetically shielding it. Each of a plurality of pickup coils are disposed on the floor beneath each group of seats, overlying the supply loop; the pickup coils are protected from abrasion by a plastic cover (not shown). As shown in FIG. 1, a typical pickup coil comprises a multi-turn coil 70. Other pickup coils (not shown) in the system also each comprise a multi-turn coil that is inductively coupled to the supply loop.

Figure 2:
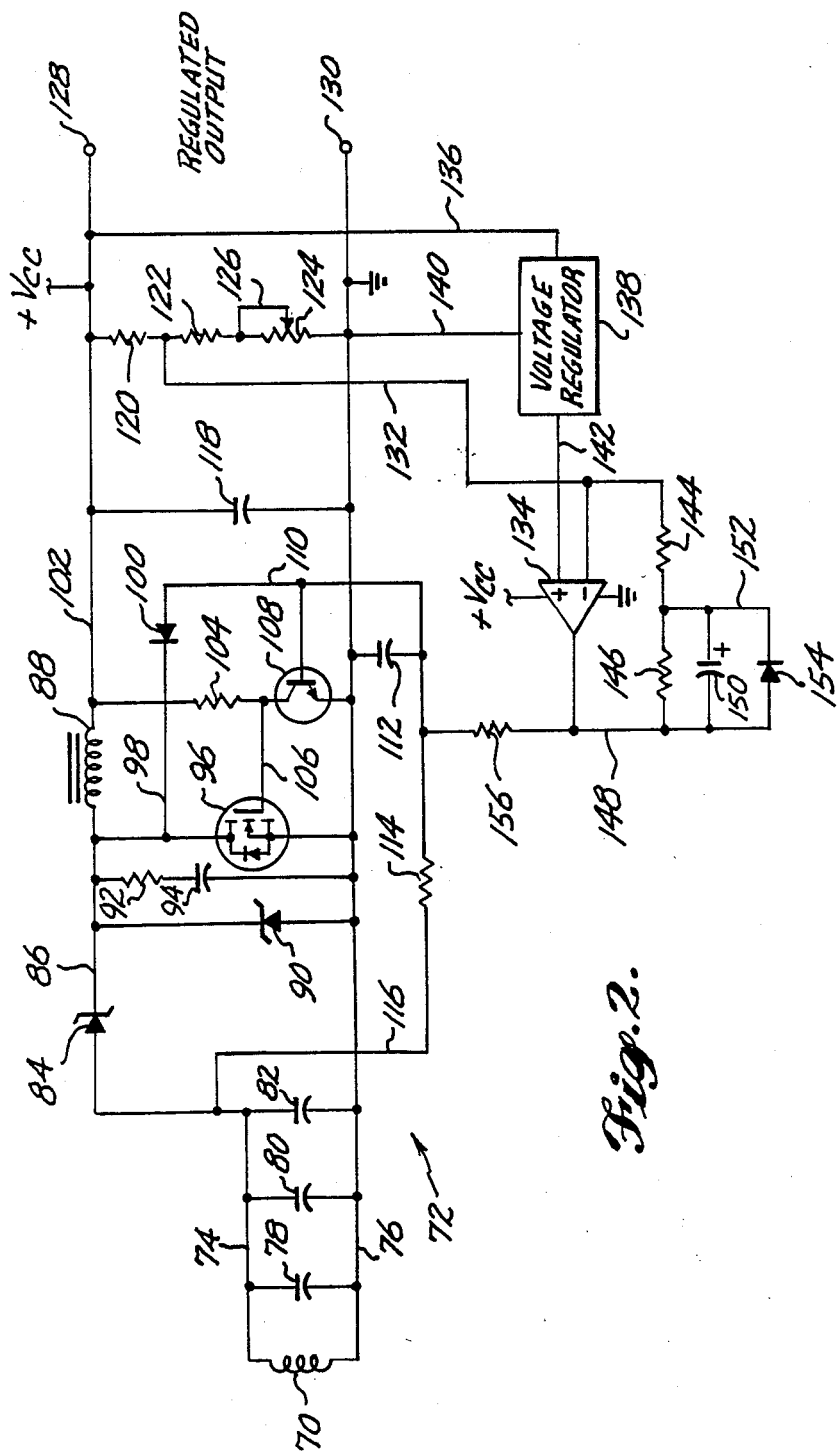
FIG. 2 is an electrical schematic diagram of a regulator circuit in accordance with the present invention.

In FIG. 2, a regulator circuit used in the power distribution system is generally identified by reference numeral 72. Regulator circuit 72 is representative of a plurality of regulator circuits, each of which is disposed within a group of seats and is operative to regulate the voltage supplied to the entertainment system and passenger service system installed within each seat of the group. Multi-turn coil 70 is connected in a resonant tank circuit through leads 74 and 76 to three parallel capacitors 78, 80, and 82. Capacitors 78, 80, and 82 may be replaced by a single capacitor having a capacitance equal to the sum of their capacitance values; however, it is preferable to use three or more parallel capacitors, since significant power may be dissipated in each capacitor of the resonant tank circuit. Due to the inductive coupling between multi-turn coil 70 and supply loop 68 (shown in FIG. 1), current at a frequency of 38 kHz circulates within the tank circuit. In the preferred embodiment, the circulating current is approximately eight amps under no load conditions, from which approximately two amps are available to supply power to a connected load.

Lead 74 also connects to the anode of a Schottky diode 84, the cathode of the Schottky diode being connected via a lead 86 to one side of an inductor (choke) 88, and to the cathode of a zener diode 90. Lead 86 is also connected to a resistor 92, which is in series with a capacitor 94, the other side of the capacitor being connected to lead 76. An N channel field effect transistor (FET) 96 is disposed in parallel with zener diode 90, having its drain connected to lead 86 and its source connected to lead 76. The drain of the FET is connected through a lead 98 to the cathode of a diode 100.

The other end of inductor 88 is connected through a lead 102 to one side of a resistor 104, which is in series with the collector of a PNP transistor 108. The collector of transistor 108 connects through a lead 106 to the gate of the N channel FET 96; the emitter of the transistor connects to lead 76, and its base is connected through a lead 110 to the anode of diode 100 and to one side of a capacitor 112, the other side of which is connected to lead 76. Lead 110 also connects to a resistor 114, the other side of which is connected through a lead 116 to lead 74.

A filter capacitor 118 is connected between leads 76 and 102. In addition, a voltage divider network comprising two fixed resistors 120 and 122 connected in series with a potentiometer 124 extends between leads 76 and 102. The common connection between fixed resistor 122 and potentiometer 124 is connected to a wiper arm 126 on the potentiometer, and the common connection between fixed resistors 120 and 122 is connected through a lead 132 to the inverting input of an operational amplifier (op-amp) 134. Lead 102 terminates at a +V output terminal 128, while lead 76 terminates at a grounded output terminal 130.

A lead 136 connects to the input of a voltage regulator 138, referenced to ground through a lead 140 that is connected between the voltage regulator and lead 76. In the preferred embodiment, voltage regulator 138 produces a five volt DC regulated output, which is connected to the noninverting input of op-amp 134 through a lead 142. Op-amp 134 obtains its operating potential, $V_{cc}$, from the potential on lead 102, and is referenced to ground via lead 76. The output of op-amp 134 connects through a lead 148 to a feedback network comprising a resistor 146 connected in parallel with a capacitor 150 and a diode 154, lead 148 being connected to the anode of the diode. The cathode of diode 154 is connected to the other ends of resistor 146 and capacitor 150 through a lead 152, and thus to one end of a resistor 144, which is also in the feedback loop, in series with the other components. The opposite end of resistor 144 is connected through lead 132 to the inverting input of op-amp 134. The output potential of op-amp 134 is conveyed through lead 148 to one end of a resistor 156, and through that resistor to lead 110.

Operation of regulator circuit 72 is readily understood from the following description. The tank circuit comprising multi-turn coil 70 and parallel capacitors 78, 80, and 82 resonates at 38 kHz, the frequency of the power inductively coupled into multi-turn coil 70 from supply loop 68. The circulating current within the tank circuit develops a sinusoidal AC potential across leads 74 and 76. Schottky diode 84 conducts positive current from lead 74 into lead 86, blocking the negative half of the AC potential. Zener diode 90 and an internal diode (not separately referenced) within N channel FET 96 convey positive-going current from lead 76 to lead 86 during the other half cycle of the AC potential on leads 74 and 76, thus allowing current to flow uninterrupted through inductor 88. Since N channel FET 96 has a lower forward impedance for positive current flow from lead 76 into lead 86, the majority of current flow in that direction flows through N channel FET 96 rather than zener diode 90. When turned ON, N channel FET 96 also conveys positive current from lead 76 to lead 86. Zener diode 90 limits the voltage difference between lead 86 and lead 76 to approximately 40 volts in the preferred embodiment, thereby protecting N channel FET 96 from drain-to-source voltage in excess of its rated voltage limit.

Resistor 92 and capacitor 94 are used in the regulator circuit as a snubber filter to prevent radio frequency (RF) noise being produced when N channel FET 96 switches between conductive and nonconductive states from propagating back into supply loop 68 from multi-turn coil 70. In fact, resistor 92 and capacitor 94 are optional, and preferably would be eliminated from the circuit in applications where EMI produced by N channel FET 96 is not considered to be a potential problem. However, for use on an aircraft, all reasonable precautions would normally be taken for reducing EMI in the regulator circuit to avoid disrupting communications equipment and other sensitive electronic gear used in the avionics system.

Inductor 88 interposes an impedance between the half wave rectified waveform on lead 86 and a DC voltage developed across output terminals 128 and 130 as a result of filtering provided by capacitor 118. In the preferred embodiment, the output voltage is predetermined and nominally set to 8 volts DC. If unregulated, the output voltage would be subject to substantial variation due to changes in the inductive coupling between supply loop 68 and multi-turn coil 70, and changes in the load current. The inductive coupling may change as a passenger rests carry-on baggage on the multi-turn coil or pushes on it with his feet, thereby reducing the physical separation between the multi-turn coil and supply loop 68. Regulator circuit 72 regulates the voltage across output terminals 128 and 130 by shunting current through N channel FET 96 for a short time interval during each cycle of the 38 nHz sinusoidal AC potential on lead 74. The N channel FET starts to shunt current only as the potential on lead 74 goes through a zero crossing, from the positive side of the waveform to the negative. The time interval during which N channel FET 96 shunts current is controlled to maintain the output at the desired nominal level.

FIG. 3 illustrates the potential waveform 200 on lead 86 with respect to time, as N channel FET 96 is switched ON once each cycle. During a time interval $t_2$, the N channel FET shunts current to ground, i.e., conducts current from lead 86 to lead 76. Starting at time 0, as the potential on lead 74 passes through a zero crossing toward the negative half of the waveform, N channel FET 96 is switched ON, and conducts current from lead 76 to lead 86. The voltage on lead 86 falls to approximately 0.3 volts as N channel FET 96 conducts, since it has low resistance from drain to source. When the potential on lead 74 becomes positive, Schottky diode 84 conducts, but N channel FET 96 remains on for time interval $t_s$. During $t_2$, current that would normally flow from lead 74 through inductor 88 into capacitor 118 and to the load is shunted to lead 76. When N channel FET 96 switches OFF, the voltage on lead 86 rises sharply along waveform segment 202. Since there is no longer a low impedance path from lead 86 to lead 76, all the current flowing through inductor 88 now comes from lead 74. Clearly, the longer N channel FET 96 shunts current each cycle, the lower will be the DC output voltage of regulator circuit 72. If no regulation was provided, waveform 200 would follow a dashed line waveform segment 204 instead of waveform segment 202, and would have the shape of a characteristic half wave rectified signal.

Regulator circuit 72 (refer back to FIG. 2) is capable of providing in excess of 2 amps output current to a load from output terminals 128 and 130, with a rated output power of 16 watts. If the load applied to output terminals 128 and 130 causes the current delivered to the load to exceed approximately 2-1/2 amps, the resonant tank circuit comprising multi-turn coil 70 and capacitors 78, 80, and 82 stops resonating, causing the voltage across output terminals 128 and 130 to drop sharply, substantially shutting down the resonant current flow within the tank circuit. For this reason, short circuit current through output terminals 128 and 130 is limited to approximately 25 milliamps. Regulator circuit 72 is designed so that even with the rated maximum load attached to output terminals 128 and 130, N channel FET 96 shunts current for at least a short time interval each cycle, thus providing for regulation of the output voltage as the inductive coupling between multi-turn coil 70 and supply loop 68 varies.

The duration of time during which N channel FET 96 acts as a current shunt is controlled with respect to a voltage produced by voltage regulator 138. Since, in the preferred embodiment, the output of voltage regulator 138 is five (5) volts DC, components of the voltage divider network comprising fixed resistors 120 and 122 and potentiometer 124 are selected and adjusted to produce a nominal five (5) volts DC on lead 132 when the desired nominal eight (8) volts DC (or appropriate other) output voltage appears across output terminals 128 and 130. Potentiometer 124 permits adjustment of the regulated voltage on output terminals 128 and 130 within a relatively broad range, e.g., from six (6) to twelve (12) volts DC, since the regulated voltage is controlled with respect to the voltage divider network output voltage on lead 132.

Op-amp 134 compares the voltage developed on lead 132 with the voltage output from voltage regulator 138 on lead 142. If the potential on the inverting input of the op-amp, which is connected to lead 132, is lower than the voltage on the noninverting input connected to lead 142, op-amp 134 produces a positive output voltage. Since the feedback network for op-amp 134 comprises a relatively high-valued feedback resistor 146 (one megohm in the preferred embodiment) and its input impedance is much lower, the gain of op-amp 134 is relatively high. Its output voltage approaches $+V_{cc}$ when the inverting input of the op-amp is even slightly lower in potential than the noninverting input. The positive output voltage from op-amp 134 is applied to the base of transistor 108 through lead 110, with resistor 156 limiting current. Since the base of transistor 108 is more positive than its emitter, which is grounded through lead 76, transistor 108 saturates. As transistor 108 saturates, the potential on lead 106, which is connected to the emitter of transistor 108 and to the gate of N channel FET 96, drops approximately to zero, or ground. When the gate of N channel FET 96 is grounded through transistor 108, it is maintained in an "OFF state," and blocks positive current from lead 86 to lead 76.

As the voltage on output terminal 128 rises above the desired nominal level, the voltage on lead 132 that is derived from the voltage on output terminal 128 rises above the voltage output from voltage regulator 138 on lead 142, causing op-amp 134 to have a substantially zero output voltage level. When the sinusoidal AC potential on lead 74 crosses from positive to negative through the zero point, the potential on the base of transistor 108 becomes negative with respect to ground, causing transistor 108 "to turn OFF," i.e., to stop conducting current between its collector and emitter junctions. Since lead 106 is connected to the +V potential on lead 102 through resistor 104, N channel FET 96 is caused "to turn ON," thereby shunting positive current from lead 86 to lead 76 and reducing the DC voltage at output terminal 128. As soon as the voltage across output terminals 128 and 130 drops to the desired level so that the potential on lead 132, which is connected to the inverting input of op-amp 134, is less than the potential from voltage regulator 138, op-amp 134 begins to produce a positive voltage. This positive voltage is applied at the base of transistor 108 and soon exceeds the negative potential provided through resistor 114. The resistance of resistor 114 is approximately five times that of resistor 156, so that the positive current flow from op-amp 134 drives the potential on the base of transistor 108 positive, even during the most negative portion of the sinusoidal AC potential on lead 74.

It will be apparent that N channel FET 96 only conducts positive current from lead 86 to lead 76 when the sinusoidal waveform on lead 74 is going from negative to positive, i.e., once per cycle. During the positive half of the sinusoidal waveform on lead 74, transistor 108 is turned ON, after delay $t_S$, either by the potential on lead 74 that is conveyed to the base of the transistor through resistor 114 or by the output from op-amp 134, which reaches the base through resistor 156. When op-amp 134 is not producing a positive output, resistors 114 and 156 operate as a voltage divider circuit for the positive potential present on lead 74, ensuring that the base of transistor 108 is positive relative to its emitter. This condition causes transistor 108 to conduct, as described above, which in turn, causes N channel FET 96 to block positive current flow from lead 86 to lead 76.

Diode 100 protects N channel FET 96 and transistor 108 from negative current spikes that may appear on the drain of the N channel FET and keeps noise spikes from turning ON transistor 108. Capacitor 112 provides a slight delay in turning OFF transistor 108, by storing positive charge, which ensures that the transistor does not turn OFF until after the potential on lead 74 passes through the zero point. Also, capacitor 112 provides the delay $t_s$ (see FIG. 3).

Capacitor 150 in the feedback network of op-amp 134 integrates the output of the op-amp, and in conjunction with resistor 144, provides a slight leading phase shift in the output signal from the op-amp, which improves the stability of voltage regulation by regulator circuit 72. Diode 154 protects electrolytic capacitor 150 against reverse potential signals that may appear on lead 148.

Regulator circuit 72 has a relatively wide range of regulation, both with respect to the inductive coupling between supply loop 68 and multi-turn coil 70, and with respect to the load connected to output terminals 128 and 130. The shunting action provided by N channel FET 96 only operates during a portion of each waveform to regulate the output voltage applied to the load and does not waste power by shunting excessive current. In addition, regulator circuit 72 is short circuit protected, since as explained above, a short circuit causes the output voltage to fall as excessive load current is drawn. Since N channel FET 96 only turns on to shunt current at the zero crossing of the potential on lead 74, minimal EMI is produced, and resistor 92 and capacitor 94 may optionally be provided to filter out most of the RF noise produced by solid-state switching.

While the present invention has been disclosed with respect to a preferred embodiment, those of ordinary skill in the art will appreciate that modifications to the disclosed embodiment may be made within the scope of the claims that follow. Accordingly, the scope of the invention is to be determined entirely by reference to the claims, and is not intended to be in any way limited by the preceding disclosure.

The embodiments of the invention in which an exclusive property or privilege is claimed are defined as follows:

1. In a power supply system having a power source for producing an AC signal that is resonantly and inductively coupled to a pickup circuit, apparatus for regulating a DC voltage on an output of the pickup circuit to a predetermined level, comprising:
    (a) means connected to the output of the pickup circuit, for producing a regulated reference voltage having a magnitude substantially less than the predetermined level;
    (b) divider means, connected to the output of the pickup circuit, for providing a comparison voltage that varies as a function of the DC voltage output from the pickup circuit and has a magnitude less than said DC voltage;
    (c) comparator means, for producing a signal that varies as a function of the difference between the regulated reference voltage and the comparison voltage; and
    (d) shunt means, connected to receive the signal from the comparator means, for cyclically shunting a current flowing through the pickup circuit so that the current circulates within the pickup circuit and does not reach its output, for an interval of time that varies as a function of said signal and with a frequency no greater than that of the AC signal.

2. The apparatus of claim 1, wherein the divider means comprise a variable voltage divider network and include means for adjusting the magnitude of the comparison voltage to determine the level of the DC voltage on the output of the pickup circuit.

3. The apparatus of claim 1, wherein the pickup circuit includes means for rectifying the AC signal coupled to the pickup circuit to produce a rectified current and means for filtering the rectified current to produce the DC voltage.

4. The apparatus of claim 3, wherein the shunt means comprise a solidstate switch connected to short the rectified current for the time interval determined by the signal from the comparator means.

5. The apparatus of claim 4, wherein the time interval in which the solid-state switch shorts the rectified current generally starts when the rectified current is substantially at a zero voltage level.

6. The apparatus of claim 1, wherein the means for producing a regulated reference voltage comprise a solid-state voltage regulator.

7. In a power supply system having a power source for producing an AC signal that is resonantly coupled to a pickup circuit, a method for regulating a DC voltage on an output of the pickup circuit to a predetermined level, comprising the steps of:
    (a) producing a regulated reference voltage having a magnitude substantially less than the predetermined level;
    (b) providing a comparison voltage that varies as a function of the DC voltage of the output of the pickup circuit and has a magnitude less than said DC voltage;
    (c) producing a signal that varies as a function of the difference between the regulated reference voltage and the comparison voltage; and
    (d) cyclically shunting a current used to produce the DC voltage for an interval of time that varies as a function of said signal and with a frequency no greater than that of the AC signal.

8. The method of claim 7, wherein the step of providing the comparison voltage comprises the step of dividing the DC voltage on the output of the pickup circuit with an adjustable voltage divider network.

9. The method of claim 7, further comprising the steps of rectifying the AC signal coupled to the pickup circuit to produce a rectified current and filtering the rectified current to produce the DC voltage.

10. The method of claim 9, wherein said step of shunting comprises the step of shorting the rectified current when the rectified current is substantially at a minimum absolute voltage level.

11. In a power supply system having a power source for producing an AC signal that is resonantly and inductively coupled to a pickup circuit, apparatus for regulating a DC voltage on an output of the pickup circuit to a predetermined level, comprising:
- (a) means connected to the output of the pickup circuit, for producing a regulated reference voltage having a magnitude substantially less than the predetermined level;
- (b) a variable voltage divider network for providing a comparison voltage that varies as a function of the DC voltage output from the pickup circuit and has a magnitude less than said DC voltage, including means for adjusting the magnitude of the comparison voltage to determine the level of the DC voltage on the output of the pickup circuit;
- (c) comparator means, for producing a signal that varies as a function of the difference between the regulated reference voltage and the comparison voltage; and
- (d) shunt means connected to receive the signal from the comparator means, for shunting a current flowing through the pickup circuit so that the current circulates within the pickup circuit and does not reach its output, for an interval of time that varies as a function of said signal.

12. The apparatus of claim 11, wherein the pickup circuit includes means for rectifying the AC signal coupled to the pickup circuit to produce a rectified current and means for filtering the rectified current to produce the DC voltage.

13. The apparatus of claim 12, wherein the shunt means comprise a solid-state switch connected to short the rectified current for the time interval determined by the signal from the comparator means.

14. The apparatus of claim 13, wherein the time interval in which the solid-state switch shorts the rectified current generally starts when the rectified current is substantially at a zero voltage level.

15. The apparatus of claim 11, wherein the means for producing a regulated reference voltage comprise a solid-state voltage regulator.

16. In a power supply system having a power source for producing an AC signal that is resonantly coupled to a pickup circuit, a method for regulating a DC voltage on an output of the pickup circuit to a predetermined level, comprising the steps of:
- (a) producing a regulated reference voltage having a magnitude substantially less than the predetermined level;
- (b) providing a comparison voltage by dividing the DC voltage on the output of the pickup circuit with an adjustable voltage divider network, said comparison voltage varying as a function of the DC voltage on the output of the pickup circuit and having a magnitude less than said DC voltage;
- (c) producing a signal that varies as a function of the difference between the regulated reference voltage and the comparison voltage; and
- (d) shunting a current used to produce the DC voltage for an interval of time that varies as a function of said signal.

17. The method of claim 16, further comprising the steps of rectifying the AC signal coupled to the pickup circuit to produce a rectified current, and filtering the rectified current to produce the DC voltage.

18. The method of claim 17, wherein said step of shunting comprises the step of shorting the rectified current when the rectified current is substantially at a minimal absolute voltage level.

* * * * *